(12) United States Patent
Staley

(10) Patent No.: US 8,966,738 B2
(45) Date of Patent: Mar. 3, 2015

(54) SCREW ASSEMBLY WITH LINKING MEMBER FOR TORQUE TRANSFER

(71) Applicant: GM Global Technology Operations LLC, Detroit, MI (US)

(72) Inventor: Eric D Staley, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/645,742

(22) Filed: Oct. 5, 2012

(65) Prior Publication Data

US 2014/0096362 A1 Apr. 10, 2014

(51) Int. Cl.
*B23P 11/00* (2006.01)
*F16B 35/00* (2006.01)

(52) U.S. Cl.
USPC ........................................ 29/525.02; 411/337

(58) Field of Classification Search
USPC .......... 29/525.02, 525.01, 428; 411/337, 349, 411/346, 550, 551, 367, 372
See application file for complete search history.

(56) References Cited

U.S. PATENT DOCUMENTS 4,975,008 A * 12/1990 Wagner .......................... 411/337
7,682,117 B2 * 3/2010 Holt et al. ...................... 411/156

* cited by examiner

*Primary Examiner* — John C Hong
(74) *Attorney, Agent, or Firm* — Quinn Law Group, PLLC

(57) ABSTRACT

A screw assembly for operatively connecting a first component to a second component is provided such that the first and the second components are separated by a clearance when operatively connected by the assembly. The assembly includes a screw member defining a screw opening and a linking member defining a link opening. A fastener is configured to transfer a driving torque to the linking member when the fastener is rotatably driven into the link opening. A threaded portion of the fastener is configured to engage with the link opening. The linking member is configured to transfer the driving torque to the screw member, thereby moving the screw member until a second screw end of the screw member contacts a mounting face of the second component. The fastener may be configured to pass through the linking member and enter a second cavity in the second component.

18 Claims, 3 Drawing Sheets

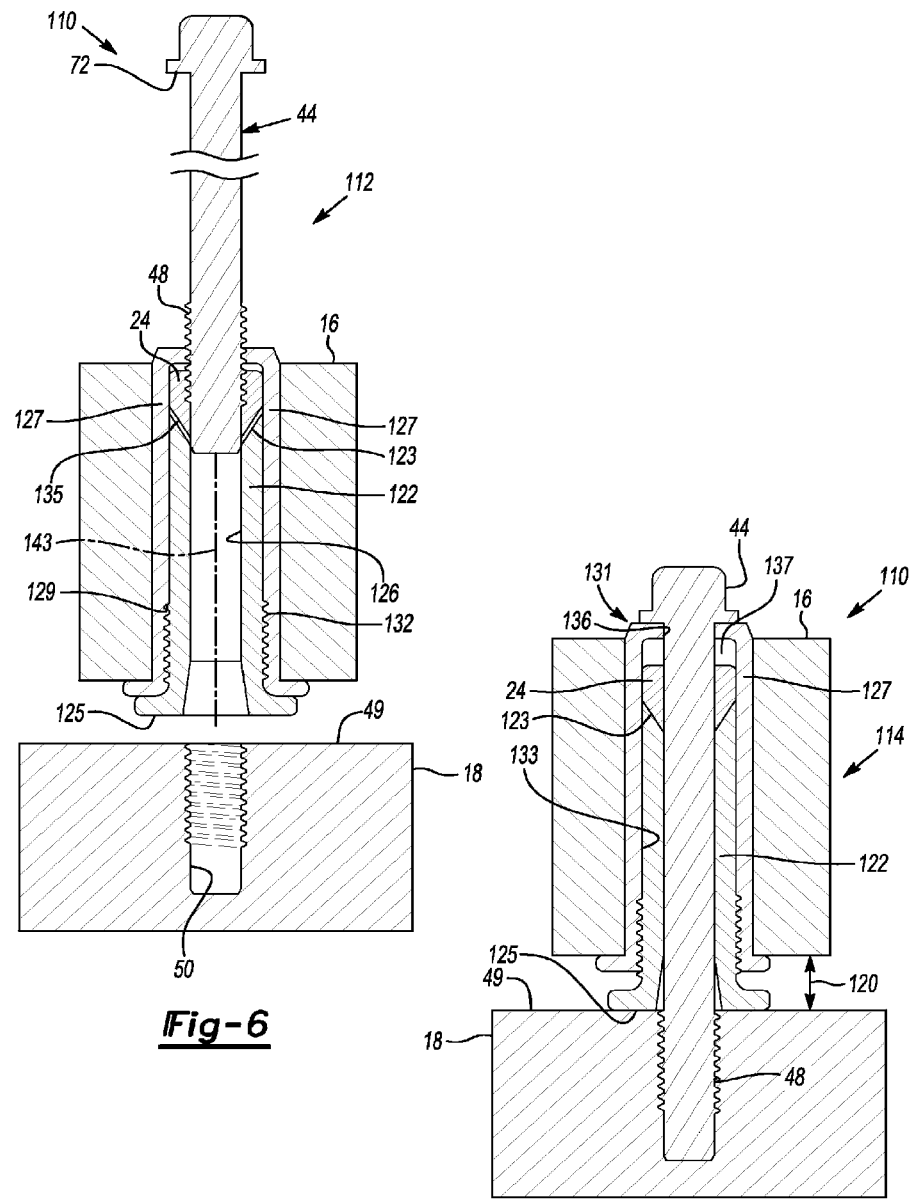

SCREW ASSEMBLY WITH LINKING MEMBER FOR TORQUE TRANSFER

TECHNICAL FIELD

The present invention relates generally to a screw assembly for operatively connecting two components.

BACKGROUND

A variety of fastening assemblies are available for mounting or connecting two components or subassemblies together. Where the two components are to be mounted with a clearance or gap in between, a screw with a threaded shaft and a head may be used, such as a jackscrew. The height of the jackscrew in the gap between the two components is typically adjusted with a separate tool, such as a wrench. Thus, a conventional screw assembly for mounting two components with a clearance in between requires a secondary or additional assembly process for setting the height of the screw in the gap between the two components.

SUMMARY

A screw assembly for operatively connecting a first component to a second component is provided where the first and the second components are separated by a clearance when operatively connected by the assembly. The screw assembly removes the secondary assembly process that is required for setting the height of a screw in the gap between the two components. The assembly includes a screw member, defining a screw opening, extending from a first screw end to a second screw end. A linking member is operatively connected to the screw member and defines a link opening extending from a first end to a second end of the linking member.

In one embodiment, the linking member is positioned at least partially within the screw opening of the screw member. In another embodiment, the linking member is positioned adjacent to the first screw end of the screw member.

A fastener is configured to be insertable within the opening of the linking member. The fastener is configured to transfer a driving torque to the linking member when the fastener is rotatably driven into the link opening. A threaded portion of the fastener is configured to engage with the link opening. The linking member is configured to transfer the driving torque to the screw member, thereby moving the screw member until the second screw end contacts a mounting face of the second component. The fastener may be configured to pass through the linking member and enter a second cavity in the second component. The second cavity may include second cavity threading configured to correspond with the threaded portion of the fastener, thereby securing the first component relative to the second component.

The screw member may define an at least partially threaded exterior surface. The first component includes a first cavity configured to receive the at least partially threaded exterior surface of the screw member. Optionally, an insert may be positioned in the first cavity of the first component and configured to at least partially encapsulate the linking member and the screw member. The insert may include an interior threaded portion configured to correspond with the at least partially threaded exterior surface of the screw member.

The link opening in the linking member may define one or more peaks and valleys. The peaks are configured to contact the threaded portion of the fastener when the fastener is inserted into the link opening. The valleys are configured to be spaced from the threaded portion of the fastener when the fastener is inserted into the link opening.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6 is a schematic cross-sectional view of a screw assembly in accordance with a second embodiment, the screw assembly being in a first position and including a screw member, linking member and insert;

FIG. 7 is a schematic cross-sectional view of the screw assembly shown in FIG. 6, the screw assembly being in a second position.

DETAILED DESCRIPTION

Figure 1:
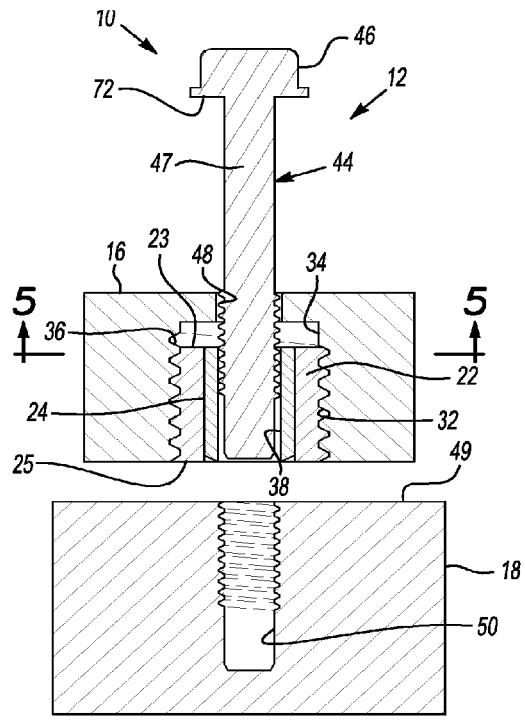
FIG. 1 is a schematic cross-sectional view of a screw assembly in accordance with a first embodiment, the screw assembly being in a first position and including a screw member, a linking member and a fastener.
Figure 2:
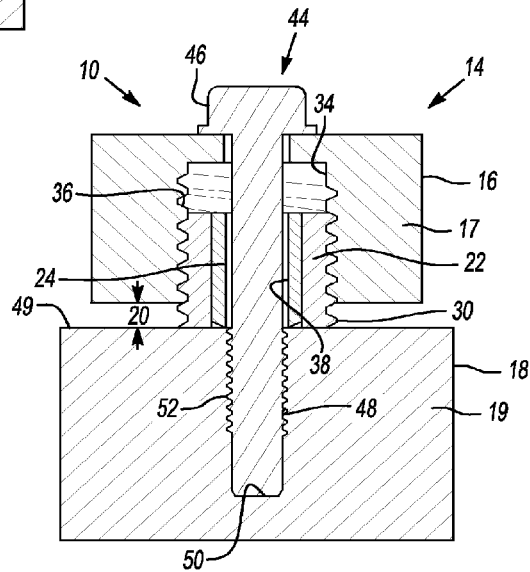
FIG. 2 is a schematic cross-sectional view of the screw assembly shown in FIG. 1, the screw assembly being in a second position.

Referring to the Figures, wherein like reference numbers refer to the same or similar components throughout the several views, FIGS. 1-2 are schematic cross-sectional views of a screw assembly 10 in accordance with a first embodiment of the disclosure. FIG. 1 shows the screw assembly 10 in a first position 12 while FIG. 2 shows the assembly 10 in a second position 14. Referring to FIG. 2, the assembly 10 may be used to operatively connect a first component 16 to a second component 18 such that the first and second components 16, 18 are separated by a clearance 20 when operatively connected by the assembly 10. By way of a non-limiting example, the clearance 20 may be 2 mm. The clearance 20 may be any size as required by the particular application.

Figure 3:
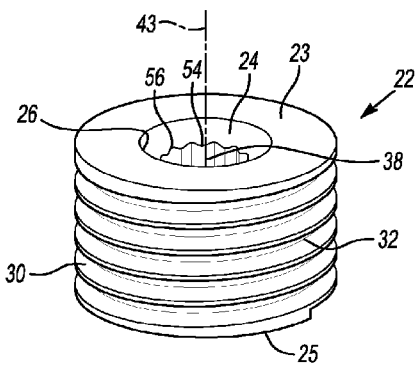
FIG. 3 is a perspective view of the screw member and linking member shown in FIGS. 1-2.
Figure 4:
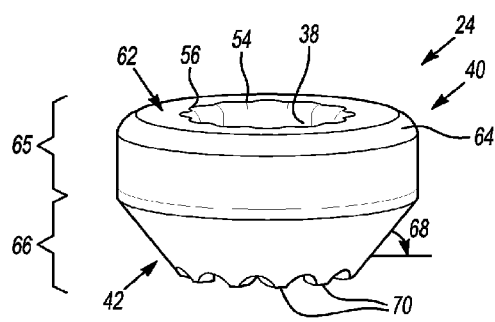
FIG. 4 is a perspective view of the linking member shown in FIGS. 1-3 and 6-7.

Referring to FIGS. 1-2, the assembly 10 includes a screw member 22 and a linking member 24 that is operatively connected to the screw member 22. FIG. 3 is a perspective view of the screw member 22 and the linking member 24. FIG. 4 is a perspective view of the linking member 24. Referring to FIG. 4, the linking member 24 includes a first portion 65 that is substantially cylindrical and a second portion 66 that is substantially tapered. The linking member 24 can be made with different relative sizes of the first portion 65 and the second portion 66. For example, in the first embodiment shown in FIGS. 1-2, the first portion 65 is substantially longer than the second portion 66. In the second embodiment shown in FIGS. 6-7, the first portion 65 is approximately the same length as the second portion 66.

Referring to FIG. 3, the screw member 22 defines a first screw end 23, a second screw end 25 and a screw opening 26. Referring to FIGS. 1-3, in the first embodiment, the linking member 24 may be positioned at least partially within the screw opening 26 of the screw member 22. For example, the linking member 24 may be pressed or molded into the screw opening 26 prior to the assembly process. The screw member 22 and the linking member 24 may be manufactured as a single piece or single component.

Referring to FIG. 3, the screw member 22 includes an exterior surface 30 that is least partially threaded, i.e., formed with exterior threading 32. Referring to FIGS. 1-2, the first component 16 includes a first cavity 34 that is configured to receive the screw member 22. Referring to FIGS. 1-2, the first cavity 34 may be formed with first cavity threading 36 corresponding to the exterior threading 32 of the screw member 22.

Referring to FIGS. 2-4, the linking member 24 defines a link opening 38. Referring to FIG. 4, the link opening 38 may extend from a first end 40 to a second end 42 of the linking member 24. Referring to FIG. 3, the link opening 38 shares a common axis 43 with the screw opening 26. In this embodiment, the link opening 38 overlaps with the screw opening 26 since the linking member 24 is positioned at least partially within the screw opening 26.

Referring to FIGS. 1-2, a fastener 44 is configured to be insertable within the link opening 38 of the linking member 24. Referring to FIG. 1, the fastener 44 includes a head 46 and a shank 47. The shank 47 defines a threaded portion 48, shown in FIGS. 1-2. Referring to FIGS. 1-2, the second component 18 includes a second cavity 50 configured to receive the fastener 44. The second cavity 50 may include second cavity threading 52 configured to correspond with the threaded portion 48 of the fastener 44.

FIG. 1 shows the assembly 10 in the first position 12, with the threaded portion 48 of the fastener 44 engaging with the link opening 38 and the second screw end 25 of the screw member 22 spaced from the mounting face 49 of the second component 18. As described below and referring to FIG. 1, the fastener 44 is configured to transfer a driving torque to the linking member 24 when the fastener 44 is driven into the link opening 38. Referring to FIG. 2, the linking member 24 is configured to transfer this driving torque to the screw member 22, causing the screw member 22 to move towards the second component 18 until the second screw end 25 contacts a mounting face 49 of the second component 18. FIG. 2 shows the assembly 10 in the second position 14, with the threaded portion 48 of the fastener 44 engaging with the second cavity 50 and the second screw end 25 in contact with the mounting face 49 of the second component 18.

Figure 5:
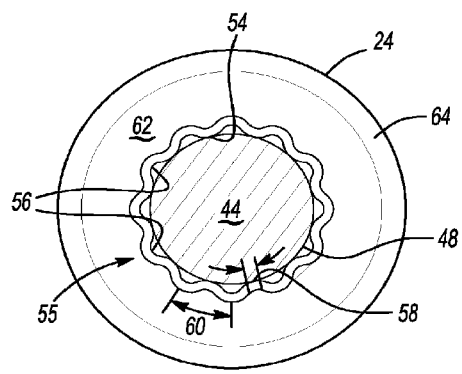
FIG. 5 is a schematic plan view of the linking member (shown in FIGS. 1-3 and 6-7) with a partly cross-sectional view of the fastener taken through axis 5-5 in FIG. 1 (the screw member and a first component are removed for clarity)

FIG. 5 is a schematic plan view of the linking member 24 (shown in FIGS. 1-2 and 6-7) with a partly cross-sectional view of the fastener 44 taken through axis 5-5 in FIG. 1 (for clarity, the screw member 22 and the first component 16 are not shown in FIG. 5). Referring now to FIGS. 3-5, the link opening 38 in the linking member 24 defines at least one peak 54 and at least one valley 56. Referring to FIG. 5, in the embodiment shown, the link opening 38 defines a waveform profile (identified generally at 55) of a repeating, propagating geometric shape having a plurality of such peaks 54 and a plurality of such valleys 56.

Referring to FIG. 5, the peak 54 is configured to engage with or contact the threaded portion 48 of the fastener 44 when the fastener 44 is driven or inserted into the link opening 38. Referring to FIG. 5, the valley 56 is configured to be spaced from the threaded portion 48 of the fastener 44 when the fastener 44 is driven or inserted into the link opening 38. In other words, the threaded portion 48 of the fastener contacts the peak 54 but not the valley 56, thereby reducing the surface area of contact between the fastener 44 and the linking member 24. Referring to FIG. 5, the waveform profile 55 defines a wavelength or distance 60 between two adjacent peaks 54 or two adjacent valleys 56. In one example, the distance 60 between two adjacent peaks 54 or two adjacent valleys 56 is approximately 2 mm. The link opening 38 may be formed with any shape, size or configuration suitable for the particular application at hand.

A method of operatively connecting the first component 16 to the second component 18 is described below. Referring to FIG. 1, the screw member 22 and linking member 24 are inserted into the first cavity 34 of the first component 16 that is being mounted to the second component 18. As noted above, the linking member 24 may be molded, pressed or otherwise positioned into the inside diameter of the screw opening 26 in the screw member 22 prior to this.

Referring to FIG. 1, the fastener 44 is rotatably driven into the link opening 38 of the linking member 24. As the fastener 44 is driven into the link opening 38, the threaded portion 48 on the fastener 44 engages with the link opening 38 of the linking member 24. The resulting interference between the threaded portion 48 and the peaks 54 in the link opening 38 transfers driving torque from the fastener 44 to the linking member 24. The driving torque is then transferred from the linking member 24 into the screw member 22, causing the screw member 22 to turn and move towards the second component 18.

Referring to FIG. 2, by rotating, the screw member 22 backs out or moves out of the first component 16 until the second screw end 25 contacts a mounting face 49 of the second component 18. In other words, the screw member 22 continues moving until the clearance 20 to the mounting face 49 of the second component 18 is made up. While the screw member 22 stops moving when it is in contact with the mounting face 49 of the second component 18, the fastener 44 continues to pass through the linking member 24 and enters the second cavity 50 in the second component 18, thereby securing the first component 16 relative to the second component 18. Referring to FIG. 1, the clamp load of the fastener 44 may be transferred from a bearing surface 72 of the fastener 44 (on the underside of the head 46), through the first cavity threading 36 of the first component 16, into the screw member 22 (through the exterior threading 32 interfacing with the first cavity threading 36), onto the second screw end 25 (or screw mounting surface 25) of the screw member 22, and into the second component 18.

Referring to FIG. 5, the waveform profile 55 of the link opening 38 reduces the surface area of contact and friction between the fastener 44 and the link opening 38 when the fastener 44 is driven into the link opening 38, thereby making it easier for the fastener 44 to go through the linking member 24. A larger surface area of contact results in greater friction while a smaller area results in insufficient torque transfer. In one example, the surface area of contact between the fastener 44 and the link opening 38 is just sufficient to transfer torque from the fastener 44 to the linking member 24 and screw member 22, causing the screw member 22 to turn and move towards the second component 18. The amount or efficiency of torque transfer may be tuned by increasing or decreasing the number of peaks 54, the wavelength 60 and the width 58 of the peaks 54 in the link opening 38. In a non-limiting example, the width 58 may be approximately 0.3 mm.

Referring to FIG. 4, the first end 40 of the linking member 24 defines a first surface 62. The first surface 62 may be a substantially flat planar surface. The linking member 24 may include a chamfered edge 64 at the first end 40. Referring to FIG. 4, the linking member 24 may includes a first portion 65 that is substantially cylindrical and a second portion 66 that is substantially tapered. The second portion 66 defines an angle 68. By way of a non-limiting example, the angle 68 may be approximately 55 degrees. In another non-limiting example, the angle 68 may be between approximately 10 and 80 degrees.

As noted above, the linking member 24 may be made with different relative sizes of the first portion 65 and the second portion 66. For example, in the first embodiment shown in FIGS. 1-2, the first portion 65 is substantially longer than the second portion 66. In the second embodiment shown in FIGS. 6-7, the first portion 65 is approximately the same length as the second portion 66. Referring to FIG. 4, the linking member 24 may include ridges 70 at the second end 42. By way of non-limiting examples, the linking member 24 may be formed with a height of approximately 9 mm and a diameter (widest width) of 16 mm. The linking member 24 may be formed with any shape, size or configuration suitable for the particular application at hand.

The linking member 24 may composed of any suitable material that is sufficiently stiff to allow torque to be transferred from the fastener 44 to the linking member 24. The linking member 24 may be composed of a non-metal. In one example, the linking member 24 is composed of an elastomer such as a synthetic rubber or rubber-like material, including but not limited to, ethylene-propylene terpolymer (EPDM), neoprene (polychloroprene), styrenebutadiene rubber, nitrile rubbers or silicone rubbers. In one embodiment, the linking member 24 is composed of a copolymer of butadiene and acrylonitrile.

The amount or efficiency of torque transfer as well as the compressibility of the linking member 24 may be tuned by the selection of the material forming the linking member 24. In one example, the material forming the linking member 24 may be sufficiently compressible such that the threaded portion 48 of the fastener 44 is not damaged when contacting the peaks 54 in the link opening 38 of the linking member 24. As is known to those skilled in the art, durometer is one of several measures of the hardness of a material, that is, the material's resistance to permanent indentation. The durometer scale, defined by Albert F. Shore, measures the depth of an indentation in the material created by a given force on a standardized presser foot. This depth is dependent on the hardness of the material, its viscoelastic properties, the shape of the presser foot employed in the test, and the duration of the test. The ASTM D2240 standard recognizes multiple durometer scales using combinations of specific spring forces and indentor configurations. The durometer is a dimensionless quantity. By way of a non-limiting example, the linking member 24 may define a durometer value of between approximately shore 20A and approximately shore 90A. By way of a non-limiting example, the linking member 24 may define a durometer value of approximately shore 50D.

In summary, the screw assembly 10 (and assembly 110 described below) removes the need for an additional assembly process for setting the height of a screw for mounting two components together with a clearance 20. In the screw assembly 10 (see FIGS. 1-2), the height of the screw member 22 is set by driving the fastener 44 through the linking member 24 operatively connected to the screw member 22. The driving torque is transferred to the screw member 22 through friction, automatically setting the height of the screw member 22. Referring to FIG. 2, once the clearance to the mounting face 49 of the second component 18 is made up, the fastener 44 continues to thread through the linking member 24 and into a second cavity 50 in the second component 18. In one example, the assembly 10 may connect an alternator 17 of a vehicle to an engine block 19 (see FIG. 2). By way of non-limiting examples, in a vehicle, the screw assembly 10 may be used to connect an alternator to an engine block, an oil pan to a front cover, an oil pan to the engine block or the alternator to a bracket, etc.

FIGS. 6-7 are schematic cross-sectional views of a screw assembly 110 in accordance with a second embodiment of the disclosure. FIG. 6 shows the screw assembly 110 in a first position 112 while FIG. 7 shows the assembly 110 in a second position 114. The second embodiment is similar to the first embodiment, thus only the differences are described herein.

Figure 8:
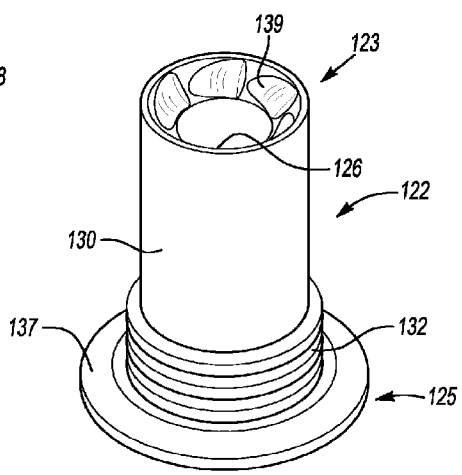
FIG. 8 is a perspective view of the screw member shown in FIGS. 6-7.

Referring to FIGS. 6-7, the assembly 110 includes a screw member 122 and a linking member 24 (shown in FIGS. 1-5) that is operatively connected to the screw member 122. FIG. 8 is a perspective view of the screw member 122. Referring to FIGS. 6 and 8, the screw member 122 defines a first screw end 123, a second screw end 125 and a screw opening 126. Referring to FIG. 8, the screw member 122 may include an exterior surface 130 that is least partially threaded, i.e., formed with exterior threading 132. The screw member 122 may be formed with a supporting base 137 that is wider than the body of the screw member 122. Referring to FIG. 8, the screw member 122 may include at least one indentation 139 formed at the first screw end 123.

Referring to FIGS. 6-7, in the second embodiment, the linking member 24 may be positioned adjacent to the first screw end 123 of the screw member 122. Referring to FIG. 6, the link opening 38 shares a common axis 143 with the screw opening 126. Referring to FIG. 7, the indentation 139 of the screw member 122 may be configured to engage with or grip the second surface 66 (shown in FIG. 4) of the linking member 24.

Referring to FIGS. 6-7, an insert 127 is positioned in the first cavity 34 of the first component 16 and is configured to at last partially encapsulate the linking member 24 and the screw member 122. Referring to FIG. 7, the insert 127 may be a hollow tube defining an insert opening 133. The fastener 44 and the screw member 122 are configured to be fittable within the insert opening 133. Referring to FIG. 6, the insert 127 includes an interior threaded portion 129 that is configured to correspond with the exterior threading 132 of the screw member 122. Referring to FIG. 7, the insert 127 may include an aperture 136 at a first insert end 131. In one example, the insert 127 is composed of a metal. In another example, the insert 127 is composed of a polymer or plastic.

Referring to FIG. 6, the insert 127 may be pressed, molded or otherwise placed within the first cavity 34 in the first component 16. The linking member 24 is inserted into the insert opening 133. The screw member 122 is threaded into the insert opening 133. Referring to FIG. 6, a gap 135 may be located between the second surface 66 of the linking member 24 and the first screw end 123 of the screw member 122.

Referring to FIG. 6, the fastener 44 is driven or passed into respective co-axially aligned openings in the insert 127, the linking member 24 and the screw member 122, that is, the insert opening 133, screw opening 126 and link opening 38. Referring to FIG. 5, the threaded portion 48 of the fastener 44 catches on the peaks 54 of the link opening 38 in the linking member 24 and the resulting interference transfers driving torque from the fastener 44 to the linking member 24.

Referring to FIG. 7, the driving force of the fastener 44 causes the linking member 24 to be wedged into the screw member 122, closing the gap 135 (shown in FIG. 6). In other words, the linking member 24 contacts the screw member 122 and pushes the screw member 122 down. The driving force of the fastener (transferred to the linking member 24) causes screw member 122 to turn and thread down until it contacts the mounting face 49 of the second component 18.

Referring to FIG. 7, when the screw member 122 stops moving (i.e., when it is up against the mounting face 49), the fastener 44 continues to move into the second cavity 50 in the second component 18, thereby securing the first component 16 relative to the second component 18. As previously noted, the second cavity 50 may be threaded. FIG. 7 shows a gap 137 that may be created above the first end 40 of the linking member 24 as it moves towards the second component 18. Referring to FIG. 6, the clamp load of the fastener 44 may be transferred from a bearing surface 72 of the fastener 44 (on the underside of the head 46), through the interior threaded portion 129 of the insert 127, into the screw member 122 (through the exterior threading 132 interfacing with the interior threaded portion 129), onto the second screw end 125 (or screw mounting surface 125) of the screw member 122, and into the second component 18.

As noted previously and referring to FIG. 4, the second portion 66 of the linking member 24 may be substantially tapered and defined by an angle 68. The angle 68 may be selected to maximize the area of contact between the second end 42 of the linking member and the first screw end 123 of the screw member 122, with a larger angle 68 leading to a larger surface area of contact between the linking member 24 and the screw member 122 and more efficient torque transfer.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A screw assembly for operatively connecting a first component to a second component, the assembly comprising:
   a screw member defining a screw opening extending from a first screw end to a second screw end;
   a linking member operatively connected to the screw member and defining a link opening extending from a first end to a second end of the linking member, the link opening and the screw opening sharing a common axis;
   a fastener having a threaded portion and configured to be insertable within the link opening of the linking member;
   wherein the fastener is configured to transfer a driving torque to the linking member when the fastener is rotatably driven into the link opening, the threaded portion of the fastener being configured to engage with the link opening;
   wherein the linking member is configured to transfer the driving torque to the screw member, thereby moving the screw member until the second screw end contacts a mounting face of the second component; and
   wherein the first and the second components are separated by a clearance when operatively connected by the assembly.

2. The assembly of claim 1, wherein the linking member is positioned at least partially within the screw opening of the screw member.

3. The assembly of claim 1, wherein the linking member is positioned adjacent to the first screw end of the screw member.

4. The assembly of claim 1, in combination with the first component, wherein:
   the screw member defines an at least partially threaded exterior surface; and
   the first component includes a first cavity configured to receive the at least partially threaded exterior surface of the screw member.

5. The assembly of claim 1, further comprising:
   a first cavity defined by the first component;
   an insert positioned in the first cavity of the first component and configured to at least partially encapsulate the linking member and the screw member;
   wherein the screw member defines an at least partially threaded exterior surface; and
   wherein the insert includes an interior threaded portion configured to correspond with the at least partially threaded exterior surface of the screw member.

6. The assembly of claim 1, in combination with the second component, wherein:
   the second component includes a second cavity configured to receive the fastener, the second cavity including second cavity threading configured to correspond with the threaded portion of the fastener; and
   the fastener is configured to pass through the linking member and enter the second cavity.

7. The assembly of claim 1, wherein:
   the link opening in the linking member defines at least one peak and at least one valley;
   the at least one peak is configured to contact the threaded portion of the fastener when the fastener is inserted into the link opening; and
   the at least one valley is configured to be spaced from the threaded portion of the fastener when the fastener is inserted into the link opening.

8. The assembly of claim 7, wherein a width of the at least one peak is approximately 0.3 mm.

9. The assembly of claim 1, wherein:
   the first end of the linking member defines a substantially flat planar surface and a chamfered edge; and
   a first portion of the linking member is substantially cylindrical and a second portion is substantially tapered.

10. The assembly of claim 1, further comprising:
    at least one indentation on the first screw end of the screw member, the at least one indentation being configured to engage with the second end of the linking member.

11. The assembly of claim 1, wherein the linking member is composed of an elastomeric material.

12. The assembly of claim 1, wherein the linking member is composed of a copolymer of butadiene and acrylonitrile.

13. The assembly of claim 1, wherein the linking member defines a durometer value of between approximately shore 20A and approximately shore 90A.

14. The assembly of claim 1, wherein the linking member defines a durometer value of approximately shore 50D.

15. A screw assembly for operatively connecting a first component to a second component, the assembly comprising:
    a screw member defining a screw opening extending from a first screw end to a second screw end;
    a linking member operatively connected to the screw member and defining a link opening extending from a first end to a second end of the linking member, the link opening sharing a common axis with the screw opening;
    a fastener having a threaded portion and configured to be insertable within the link opening of the linking member;
    wherein the fastener is configured to transfer a driving torque to the linking member when the fastener is rotatably driven into the link opening;
    wherein the link opening in the linking member defines a plurality of peaks and a plurality of valleys, the plurality of peaks being configured to contact the threaded portion of the fastener and the plurality of valleys being configured to be spaced from the threaded portion of the fastener when the fastener is driven into the link opening;

wherein the linking member is configured to transfer the driving torque to the screw member, thereby moving the screw member until the second screw end contacts a mounting face of the second component; and wherein the first and the second components are separated by a clearance when operatively connected by the assembly.

16. A method of operatively connecting a first component to a second component such that the first and second components are spaced by a clearance, the method comprising:

inserting a linking member and a screw member into a first cavity in the first component, the linking member defining a link opening extending from a first end to a second end of the linking member;

rotatably driving a fastener into the link opening in the linking member;

transferring a driving torque from the fastener to the linking member when a threaded portion of the fastener engages with the link opening;

transferring the driving torque from the linking member to a screw member, thereby moving the screw member until a second screw end of the screw member contacts a mounting face of the second component; and threading the fastener through a second cavity in the second component, thereby operatively connecting the first and second components.

17. The method of claim 16, wherein the screw member defines a screw opening and further comprising, prior to the inserting of the linking member and the screw member into the first cavity:

attaching the linking member in the screw opening of the screw member.

18. The method of claim 16, further comprising, prior to the inserting of the linking member and the screw member into the first cavity:

positioning an insert into the first cavity, the insert defining an insert opening and including an interior threaded portion at a second end of the insert; and wherein the linking member and the screw member are inserted into the insert opening in the first cavity.

* * * * *